(12) United States Patent
Guerrero et al.

(10) Patent No.: US 8,396,204 B2
(45) Date of Patent: Mar. 12, 2013

(54) CALL CENTER RESOURCE ALLOCATION

(75) Inventors: Jose Luis Beltran Guerrero, Palo Alto, CA (US); Xin Zhang, San Jose, CA (US); Ivan Adrian Lopez Sanchez, Sonora (MX); Ming Hu, Toronto (CA); Shailendra K. Jain, Sunnyvale, CA (US); Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4 days.

(21) Appl. No.: 13/267,231

(22) Filed: Oct. 6, 2011

(65) Prior Publication Data

US 2012/0087486 A1  Apr. 12, 2012

Related U.S. Application Data

(60) Provisional application No. 61/404,745, filed on Oct. 9, 2010.

(51) Int. Cl.
*H04M 3/00* (2006.01)

(52) U.S. Cl. ......... 379/265.01; 379/265.02; 379/265.11; 379/265.12; 379/265.13; 379/266.01

(58) Field of Classification Search . 379/265.01–266.01
See application file for complete search history.

(56) References Cited

U.S. PATENT DOCUMENTS

| 6,044,355 | A | 3/2000 | Crockett et al. | |
|---|---|---|---|---|
| 6,553,114 | B1 | 4/2003 | Fisher et al. | |
| 6,925,165 | B2 | 8/2005 | Cohen et al. | |
| 6,970,829 | B1 * | 11/2005 | Leamon | 705/7.14 |
| 7,110,525 | B1 | 9/2006 | Heller et al. | |
| 8,015,042 | B2 * | 9/2011 | Seetharaman et al. | 705/7.12 |
| 2004/0240659 | A1 * | 12/2004 | Gagle et al. | 379/265.01 |
| 2004/0264672 | A1 * | 12/2004 | Paek et al. | 379/221.03 |
| 2008/0144803 | A1 | 6/2008 | Jaiswal et al. | |
| 2010/0172485 | A1 * | 7/2010 | Bourke et al. | 379/265.05 |

FOREIGN PATENT DOCUMENTS

WO  WO2010043171  4/2010

OTHER PUBLICATIONS

Cezik, et al., "Staffing Multiskill Call Centers via Linear Programming and Simulation", viewed on Oct. 8, 2010, retrieved from http://citeseerx.ist.psu.edu/viewdoc/download?doi=10.1.1.141.2442&rep=rep1&type=pdf, 34 pages.
Wallace, et al., "A Staffing Algorithm for Call Centers With Skill-Based Routing", Aug. 20, 2004, 28 pages.
Bassamboo, et al., "On a Data-Driven Method for Staffing Large Call Centers", Feb. 27, 2007, 44 pages.
Feldman, et al., "Staffing of Time-Varying Queues to Achieve Time-Stable Performance", Nov. 2004, Revision: Nov. 25, 2005, 27 pages.
Pot, et al., "A Simple Staffing Method for Multi-Skill Call Centers", Vrije Universiteit, De Boelelaan 1081a, 1081 HV Amsterdam, The Netherlands, Final Version, retrieved from http://www.aukepot.com/pdf/MultiSkillStaffing.pdf, viewed on Oct. 18, 2010, 14 pages.

* cited by examiner

*Primary Examiner* — Joseph J Nguyen

(57) ABSTRACT

A method for determining call center resource allocation can include modeling call center performance over an operations time period using a computer. A number of replicas of the modeled call center performance are simulated, using the computer, over a planning time period, each replica having random contact arrivals and contact service times following a stochastic arrival and service process according to a probability distributions of inter-arrival time and service time. Multiple iterations of each simulation are run on the computer to optimize call center resource allocation. A particular simulation iteration is tested against a criterion of convergence, and call center resource is allocated based on the particular simulation iteration with a successful criterion of convergence.

15 Claims, 5 Drawing Sheets

CALL CENTER RESOURCE ALLOCATION

RELATED APPLICATIONS

This patent application is related to, and claims priority to, U.S. provisional patent application Ser. No. 61/404,745, entitled "Call Center Resource Allocation," filed on Oct. 9, 2010, commonly assigned herewith, and hereby incorporated by reference in its entirety.

BACKGROUND

Advances in technology have resulted in conveniences that prior generations never imagined. Items such as cell phones, computers, personal digital assistants (PDAs), and mobile communications devices can be seen most everywhere. Many new automobiles are manufactured with global positioning satellite (GPS) systems. The internet has provided a plethora of new conveniences. On-line access to bank accounts and credit card accounts is becoming the norm. Electronic commerce transactions, including on-line shopping, are commonplace. All of these high tech systems are changing daily life from that which existed only a few years ago, and changing the way people interact with one another to obtain goods and services.

One item, however, that necessarily accompanies the use of so many high tech systems is that instruction, service, and repair issues will undoubtedly arise. As more automated and computerized systems are introduced, the complexity of systems increases, and more people use such systems, the volume of instruction, service, and repair issues increase. Many organizations utilize a call center to handle instruction, service, and repair customer contacts.

Methods for handling requests associated with instruction, service, and repair can vary greatly among industries and organizations, but a balance between cost, response speed, accuracy, and efficiency is involved, as in other customer service encounters. A common complaint with many customers regarding call center service concerns extended hold times before reaching the right customer service representative to resolve their request. It is not uncommon for a customer to experience delays waiting to obtain service, and/or to be transferred among representatives (in some cases several times) to have their question answered or their request for service handled. Such experiences often lead to customer dissatisfaction.

DETAILED DESCRIPTION

Figure 1:
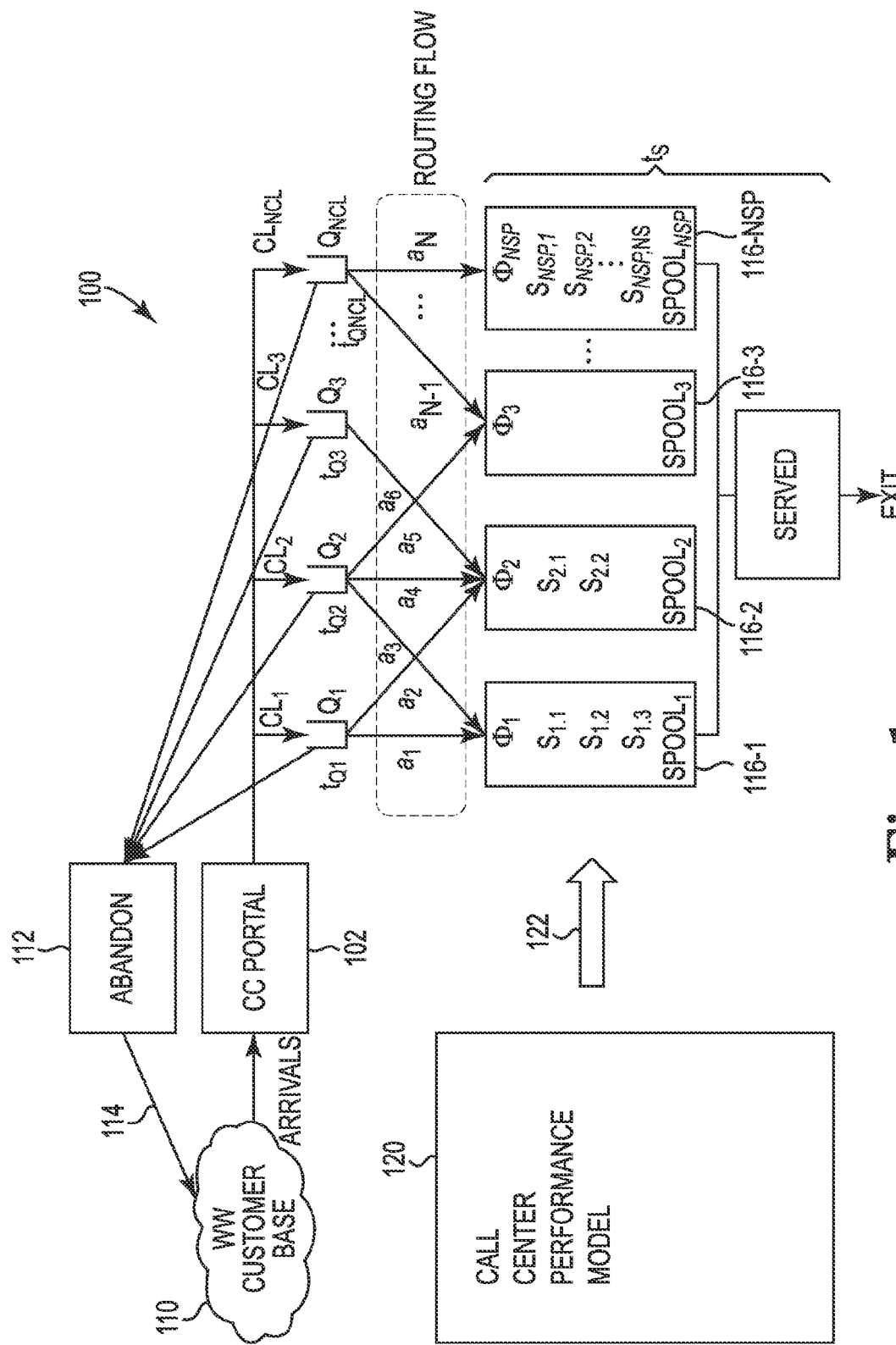
FIG. 1 illustrates a call center utilizing resource allocation according to the present disclosure.

Embodiments of the present disclosure may include methods, systems, and computer readable media with executable instructions, and/or logic. An example method for determining call center resource allocation can include modeling call center performance over an operations time period using a computer. A number of replicas of the modeled call center performance are simulated, using the computer, over a planning time period, each replica having random contact arrivals and contact service times following a stochastic arrival and service process according to probability distributions of inter-arrival time and service time. Multiple iterations of each simulation are run on the computer to optimize call center resource allocation. A particular simulation iteration is tested against a criterion of convergence, and call center resource is allocated based on the particular simulation iteration with a successful criterion of convergence.

One or more example methods for determining call center resource allocation can include modeling call center performance over an operations time period and through accounting for many behavioral component and/or one or more objective functions, such as multiple skills for a network. In this manner, the methods for determining call center resource allocation of the present disclosure can accommodate a great level of complexity. Simulation iterations tested against a criterion of convergence can be stopped when the criterion of convergence is successful within the particular simulation iteration while meeting one or more optimization goals related to efficiency and quality of service.

One aspect with respect to the systems and methods of the present disclosure involves determining a call center allocation of resources. The resources generally include servers (i.e., people serving call center clients), but the systems and methods of the present disclosure can also be applied to other assets that may be used to serve call center contacts, such as particular equipment, facilities, computing time, bandwidth, etc. where the resources may or may not have unique characteristics that allow them to be categorized. For example, some call center contacts may require a particular computing resource running a specific type of software, for which a finite quantity of licenses is available to service the particular call center contacts.

Call centers remain one of the preferred choices by the service industry to deliver critical services, connect to, or keep in contact with their world wide customer base. For instance, call centers are largely used for customer service contacts, help desk, technical support under contract or warranty, etc. Call centers may also be used to proactively manage customer relations, such as by initiating customer contact to promote sales, survey, follow-up, etc.

As used herein, a "call center" intends operations to handle voice communications and/or written communications such as electronic messaging that may involve a communication other than a telephone call. A call center handling voice communications will be used to illustrate the features of call center resource allocation according to the present disclosure. However, the reader will appreciate that the features of the present disclosure are applicable to implementations utilizing written communications such as electronic messaging, among others, as long as their quality of service metrics (described in this document) are equivalent. As such, the reader will appreciate that a contact with a call center, whether by voice or electronic messaging, is hereinafter referred to as a "call" for convenience unless otherwise specified (e.g., a telephone call, email, text, web chat, etc).

Customers connect to call center servers (e.g., customer service agents, organization representatives) typically by telephone and/or electronic messaging (e.g., e-mail, texting, web chat, etc.). As used herein, "servers" refer to those people serving others in regards to a call center such as those answering telephone calls, as distinguished from a "server device," which is a computer conventionally used to serve electronic files. Sometimes servers receive voice and/or electronic messages from an automatic system(s) regarding service inquires (e.g., concerning system failures) which require a return communication.

Large companies can handle millions of contacts (e.g., calls) with its customers per year, utilizing thousands of servers (e.g., customer service agents) and other resources in handling the contacts. The contacts may be in regards to one or more of thousands of products and/or services. Thus, call centers handling a large volume of calls may require complex resource planning in order to bring a wide range of knowledge in an appropriate quantity for demand in particular areas of a knowledge base encompassing variable subject matter. However, analyzing and scheduling call center resources, including servers, can result in large and expensive inefficiencies due to lack of proper analytics to optimize call center operations.

On average, call center contacts (e.g., calls) can have a relatively short service time (e.g., minutes to a few hours). The level of service quality desired/required can be dependent on the number of servers available at a call center at any given time. Service quality impacts the amount of time to serve a call, which in turn, can be affected by the quantity of servers. A buffer of servers can ensure availability and absorption of the randomness of the call center contacts, as some calls may require more time than average, and peak quantities of calls may be received during some periods of time. However, staffing a call center with an abundance of servers (e.g., customer service agents) so as to promptly take calls and minimize customer wait time in a queue can result in servers having unproductive idle time waiting for calls to arrive. Furthermore, the extent of uncertainty (e.g., uncertainty as to the timing of call arrival) can dramatically increase the complexity of planning what service/skills will be required to address a respective call (e.g., subject matter of the call), time to disposition call, customer impatience, other (e.g., non-people) resources needed, etc.

Call resolution is critical to customer satisfaction, thus servers can need a set of hard and/or soft skills, for example, hard skills to handle a technical issue properly and/or soft skills to handle the customer relations aspects of a contact successfully. Making all the appropriate resources and skills towards keeping customers satisfied in a timely and cost effective manner is a prime criterion by which a successful call center contact is measured. At a minimum, penalties in the marketplace associated with poor customer service are to be avoided to the extent possible.

FIG. 1 illustrates a call center utilizing resource allocation according to the present disclosure. For ease of understanding, FIG. 1 shows an example call center 100 with a queuing arrangement in simplified block diagram format. The call center 100 queuing arrangement may be implemented in a centralized and/or dispersed manner with physical portions thereof being communicatively coupled and operated in a coordinated manner. A call center 100 may be operated by the organization associated with one or more particular products being serviced by the call center 100, or may be a third party providing such services based on a contract.

A world wide customer base 110 can include different classes of customers. As used herein, a "customer" intends an entity being served by the call center, including prospective purchasers of particular products and/or services. A customer class can represent a group of customers with particular characteristics, such as customers associated with a particular product or group of similar products, customers having a particular contract service for particular products and/or services purchased from a company, an/or customers communicating in a specific language. Customers may have a contract service by virtue of a base warranty, purchased extended warranty, and/or service contract associated with one or more particular products.

A customer can contact the call center 100 to inquire about a resolution to an issue or to obtain service (e.g., set-up, training, product registration, etc.). Call center contacts, such as voice communications and/or electronic messages, can arrive at the call center 100 via a call center portal 102 (e.g., a voice computer system, web interface, etc.). The call center portal 102 can be configured to accommodate telephone calls and/or other electronic communications, including packet-based (e.g., digital) voice communications. A call center contact can represent a customer attempt to reach the call center, even if the customer does not ultimately reach a server.

Contacts concerning a variety of subject matter may be received by the call center 100. A number of server skill sets (also referred as server pools) 116-1, 116-2, . . . , 116-NSP may be used to address the variety of subject matter, where NSP is the number of server pools, each server pool having a distinct skill set. A call center performance model 120 may be used to simulate and optimize call center resource allocations such as to determine the number of server pools, subject matter of server pools, number of servers per pool, skills of servers, etc. Call center resource allocations can be based on optimized call center performance model results 122. That is, call center resources (e.g., quantity, characteristics) can be set according to results 122 of the call center performance model. Optimized call center resource allocations can be determined by measures of efficiency, proficiency, cost-effectiveness, and/or combinations thereof, among other criterion.

Each server pool may include a quantity of servers (e.g., zero or more) who have some level of the corresponding skill set and are assigned to address those contacts having subject matter that may be addressed by a server having skills associated with a particular skill set. Embodiments of the present disclosure are not limited to the number of server pools and/or skill sets shown in FIG. 1, and more or fewer server pools and/or skill sets may be used to serve contacts than those shown. Also, server pools may include more or fewer servers with particular skill sets than those shown in FIG. 1.

A call center contact may be preliminarily screened by a call center representative, or the customer may be prompted for input information that defines the issue, service, desired skill set, or other classification to enable association with a particular customer class. Modern telecommunication and/or electronic communications systems are capable of obtaining and retaining such classification information. For example, by a sequence of questions and answers, an automated system of the call center portal 102 can classify the call center contact (e.g., call) into a particular customer class, and route the call to a corresponding queue, $Q_i$, where i denotes the customer class. As shown in FIG. 1, queues are denoted as $Q_1$, $Q_2$, $Q_3$, . . . , $Q_{NCL}$, where NCL indicates the number of customer classes. Although FIG. 1 shows a queue corresponding to each customer class, embodiments of the present disclosure are not so limited and correspondence between customer classes and queues can be implemented in other applicable arrangements.

In order to have the customer of a call center contact served, the call center system attempts to route the customer to a particular server who is enabled to serve such a class of customer. A contact is placed in one of the several queues, if necessary to wait before the contact can be addressed by a server (e.g., agent). Queues may be implemented physically (e.g., routing an electronic message to a storage medium) or may be implemented administratively, for example by the customer's telephone call being placed on hold and its relative order to the arrival time of the call of other customers can be tracked such that calls are taken off hold in the same order as they were placed on hold (e.g., FIFO).

A server (e.g., customer service agent) enabled to serve the customer is normally trained in the subject matter relevant to one or several customer classes, which is denoted in FIG. 1 by skill number identification (ID) (e.g., skills 1, 2, ..., NCL). The call center can divide these skills in various skill sets to rationalize how much training will be provided to servers. For example, the skill sets $\Phi_1, \Phi_2, \Phi_3, \ldots, \Phi_{NSP}$, are the skill sets to hold the complete skill sets served by the call center, one skill set per server pool again where NSP corresponds to the number of server pools. In the context of the methodology of the present disclosure illustrated in FIG. 1, a customer class can correspond to a matching skill ID (e.g., linux operating system, Unix operating system, etc.). More generally, servers can have skill sets with multiple skills. For example, servers with skill set $\Phi_1$ have the skills and/or training to serve customer class 1 and class 2, as indicated in FIG. 1 by correspondence arrows $a_1$ and $a_3$. Servers with skill set $\Phi_2$ have the skills and/or training to serve customer class 1, class 2, and class 3, as indicated in FIG. 1 by correspondence arrows $a_2$, $a_4$, and $a_6$, etc.

When two or more servers have identical skill capabilities, they can be grouped into a server pool denoted by $SPOOL_k$ where k denotes the pool number. For instance, server pool 1 (e.g., $SPOOL_1$) 116-1 is shown in FIG. 1 as including three servers: $S_{11}, S_{12}$, and $S_{13}$. Server $S_{11}$ denotes the first server of skill pool 1, server $S_{12}$ denotes the second server of skill pool 1, etc. Each of servers $S_{11}, S_{12}$, and $S_{13}$ has skill set $\Phi_1$.

The "Routing Flow" is the network connecting queues to server pools. The connection communicates a customer to a server associated with a particular server pool according to the server's capability, schedule and availability status. The logical arrow depends on the server's skill capability required by the customer class in the queues, so that customers can be routed on server availability and capability. For example, the logical arrow between queue 2 and server pool $SPOOL_1$ in FIG. 1 denotes that any server in the server pool 1 is capable of addressing call center contacts associated with customer class 2 (that might be waiting in queue 2). A logical arrow in the Routing Flow illustrated in FIG. 1 is denoted by $a_j$, where j denotes the flow activity. Logical arrows connect a particular queue to those servers in a server pool that are capable of handling the contacts in a respective queue. For instance, a call center contact in a queue can be routed to one of the server pools indicated by the logical arrows originating from the queue. The contact can be further routed to any available server in the server pool.

For example, server pool 2 ($SPOOL_2$ 116-2) is shown in FIG. 1 as including two servers: $S_{21}$ and $S_{22}$. Server $S_{21}$ denotes the first server of pool 2, and server $S_{22}$ denotes the second server of pool 2. Each of servers $S_{21}$ and $S_{22}$ has skill set $\Phi_2$. Server pool 3 (e.g., $SPOOL_3$) 116-3 is shown in FIG. 1 as including no servers. That is, no servers with skill set $\Phi_3$ are available at certain time; however, they may be available at different day of week, etc. However, FIG. 1 shows servers in $SPOOL_1$ 116-1 posses the requisite skills and/or training to service call center contacts of customer class 1 and 2 as indicated by arrows $a_1$ and $a_3$ respectively. Similarly, FIG. 1 shows that a server in $SPOOL_2$ 116-2 posses the requisite skills and/or training to service call center contacts of customer class 1, as indicated by arrow $a_2$. FIG. 1 also shows servers in $SPOOL_2$ 116-2 posses the requisite skills and/or training to service call center contacts of customer classes 2 and 3, as indicated by arrows $a_4$ and $a_6$ respectively. Conversely, according to FIG. 1, a customer class 1 can only be served either by server pool 1 or by server pool 2. A single contact service is not split. A contact service is wholly served by the server once it is assigned. The dual arrows indicate that a contact can be routed to either server pool. FIG. 1 further shows servers in $SPOOL_3$ 116-3, if there were any, would posses the requisite skills and/or training to service call center contacts of customer classes 2 and NCL, as indicated by arrows $a_5$ and $a_{N-1}$ respectively. Servers in $SPOOL_{NSP}$ 116-NSP posses the requisite skills and/or training to service call center contacts of customer class NCL, as indicated by arrow $a_N$.

According to the present disclosure, a contact (e.g., customer) may be routed from a queue as soon as a capable server (e.g., a server having a proper skill set) is free. The customer waiting time in a queue can be tracked and generally will be zero or more. The customer waiting time associated with particular queues can be individually tracked and denoted as shown in FIG. 1 (e.g., $t_{Q1}, t_{Q2}, t_{Q3}, \ldots t_{QNCL}$).

When several servers possessing a skill set that can service a queue are idle, and a customer arrives in such a queue, the customer can be assigned to one of these servers according to an assignment policy. Embodiments of the present disclosure may utilize different assignment policies to assign the customer to any of the free servers. One assignment policy commonly used is the first in—first out (FIFO) rule. Under a FIFO rule the customer is assigned to the server with longest idle time. Other policies can depend on priorities assigned to certain customer classes. The FIFO rules can also be assigned through a sequence of the priorities, and/or to a combination of parameters, such as customer class priorities, length of queue, and/or server idle time, etc.

The several servers possessing a skill set that can service a queue can be members of different server pools. For example in one or more embodiments of the present disclosure a server in $SPOOL_1$ and another server in $SPOOL_2$ may be idle when a contact is placed in queue 2. The contact can be routed to the particular server that has the longest idle time regardless of whether the server is in $SPOOL_1$ or $SPOOL_2$. According to one or more other embodiments of the present disclosure, a modified FIFO assignment policy may direct a contact waiting in queue 2 to be routed to a server in $SPOOL_2$ if available, even if the server in $SPOOL_2$ is not the server that has the longest idle time. If no server in $SPOOL_2$ is available, the contact waiting in queue 2 can be routed to a server in $SPOOL_1$ or $SPOOL_3$ that has the longest idle time.

That is, assignment policies may be based on certain skill sets being primary to serve a particular customer class passing through a corresponding queue, and other skill sets being secondary to serve the particular customer class passing through a corresponding queue (e.g., if a server with the primary skill set is not immediately available). For example, a primary skill set may be laser printers and a secondary skill set may be printers in general. A server may be trained to have general knowledge about printers but may also be specially trained to be expert on laser printers. Thus, if a call center contact is determined to be in a laser printer customer class, the assignment policy in use may direct the customer to be served by a server having the laser printer skill set as a "primary" skill set if available, or otherwise be served by a server only having the generalized printer skill set (or the laser printer skill as a "secondary" skill set) if a laser printer expert is not immediately available.

When there are multiple customers waiting in a queue, and a capable sever becomes available, a customer may be assigned also according to an assignment policy, such as those described above (e.g., FIFO).

If call center contact arrival traffic is too high for the number of servers, some may end up waiting in one or more queues for too long. Customers connecting through phone tend to have a limited patience, and each may have a threshold time at which point they may end the call before service. Some contacts waiting in a queue will not wish to wait long enough to pass through the entire queue, or may not be able to wait for the entire queue waiting time, and will abandonment their contact. For example, a telephone caller may hang up, or a web chat connection may be terminated. Thus, a particular contact may be considered (e.g., classified) as going abandoned 112. The time a customer waits before abandoning can be denoted by $W_a$. Some portion of abandoned contacts 114 may return to the call center 100 as new contacts at some later time, for example, at an off-peak hour or a time more convenient for the customer to wait longer.

Once the customer is assigned to a server (e.g., a customer service agent), the service inquire takes place. The total time a customer is being served is denoted by the service time $t_s$, during which the server is fully allocated to the service. Servers eventually serve the call center contacts (e.g., customers) assigned to them. Once served, the customer exits the call center. While the queue and served portions of the call center 100 are illustrated as specific locations to which a particular contact is routed, it will be understood that the queues and serving portions need not be physical locations to which contacts and/or customers are physically transported, but rather classifications made to characterize one or more contacts/customers. That is, a queue may simply be tracking an order by which contacts arrive and are stored pending further action. Examples of a queue can include an e-mail inbox organized by message date/time received, or lines of a telephone system of callers on hold for which the order at which a call was received is tracked. Examples of the serving portion of the call center can include an electronic communication being viewed by a server, or a server connecting to a telephone line in order to speak with a person.

At any given time, servers will be members of only one skill set. However, servers may be capable in more than one skill set and scheduled to different server pools with different skill sets according to defined shift schedules. That is, servers can be cross-trained to be capable of being a member of more than one skill set. Servers may also possess different levels of skill associated with particular skill sets. For example, a server may be an expert with respect to one skill set and be a generalist with respect to one or more additional skill sets.

As people, servers are also bound by some scheduled and unscheduled behavior. For instance, servers that work at a call center typically have working schedules defining the beginning and end of their participation in the call center. There may be some restrictions as to number of hours of participation each day and/or hours per week, called shifts. Between the start and end of any given shift servers may have scheduled breaks such as lunch or meetings, or may have unscheduled unavailability, for example due to tiredness or fatigue, interruptions related to unreliable equipment, etc. Also, a particular server may have multiple skill sets (e.g., skill $\Phi_1$ and skill $\Phi_2$), but a manager may enable/disable the server's participation in a particular server pool based on forecast or emerging needs of the call center. For instance in the morning a multi-skilled server may be deployed to a skill pool servicing customer class 1, and be deployed to another server pool in the afternoon. Therefore, the Routing Flow can be time dependent.

Other assignment schemes are possible and the present disclosure does not limit such flexible assignment schemes. More skills, more levels of skills, and more complex assignment processes are contemplated. Assignment schemes may also vary for a particular server over time. For example, a server may be assigned to only one server pool during high call volume times, and assigned to other skill pool during times experiencing low call volumes.

The total quantity of contacts in the call center 100 can include those contacts in the various queues and those contacts being served. The time to have a contact dispositioned through the call center can be the sum of $t_Q + t_S$, the time a contact waited in a queue plus the time it took to be served (e.g., by a server). Total wait time metrics can be derived from the individual queue metrics and serve time metrics.

There are several challenges in achieving efficient call center resource allocation, and many variables to be considered, including (1) prediction of customer contacts (e.g., calls) and customer behavior associated therewith; (2) prediction of the subject matter associated with the predicted customer contacts; (3) deploying a sufficient quantity of resources corresponding to the predicted volume and subject matter of the contacts, including training and scheduling an appropriate depth and breadth of skills commensurate to the call center implementation (e.g., training and/or scheduling servers corresponding to certain skill sets including hard and soft, primary and additional skills) to manage the expected range of customer contacts (e.g., problems, inquires, etc.).

Various embodiments of the present disclosure meet the above-mentioned challenges to quality of service. For example, when a customer calls and there is no available server corresponding to a particular customer class, the customer is forced to wait in a queue, as described with respect to FIG. 1. If the contact is abandoned due to a queue wait time exceeding the customer's patience and/or ability to continue waiting, quality of service is negatively impacted since the contact did not result in an acceptable resolution. Furthermore, customers that wait too long in a queue for relevant customer service usually perceive the customer service contact more negatively, even if the contact ultimately results in a resolution to the underlying issue prompting the contact. Poor quality of service may lead to future loss of business and/or other undesirable consequences for the company.

Quality of service can be measured, for example, by surveys of customers and/or people who have had a particular experience, such as a recent contact with a call center. Also, certain objective aspects of call center performance can be measured, such as volume, wait time, call length after being answered, abandonment rates, etc.

Some entities contract for call center services. Quality of service terms, such as those referred to above, can be included in contractual agreements. Such quality of service terms can be referred to as a service level agreement (discussed further below). In case of contractual obligations, long wait times may lead to violation of service level agreements, and have associated express penalty costs.

Referring again to FIG. 1, to avoid quality of service deterioration, each applicable server pool should be staffed with enough servers to meet the expected contact volume and expertise demands. Quality of service considerations are balanced against the costs associated with having the necessary resource available and setting up a rich variety of skill sets.

The optimal selection of skill sets is complex. Previous approaches to resource allocation models often limit the complexity with an assumption of a server having only a single skill set. In a multi-skilled environment (e.g., servers have more than one skill set), a server's skill mix adds additional complication to an already complex problem. That is, servers can be cross-skilled, having for example, a primary skill set and a secondary skill set, or more than two skill sets. A server can have a different proficiency in each of multiple skill sets. For example, a server may be an expert in skill set 1 (related to customer class 1), have adequate knowledge (e.g. as a mid/advanced trainee) in skill set 2, and have no knowledge with respect to skill 3. As such, the server may be deployed in a call center as a primary resource with respect to skill set 1, and as a back-up (e.g., overflow) resource with respect to skill set 2, and not be available to handle contacts related to skill set 3. A server may only be able to handle effectively a limited number of skills.

Increased scheduling flexibility may be realized utilizing servers with multiple skills. For example, low call center contact volume of several customer classes can cause low resource allocation levels and low resource utilization since servers will spend time waiting for calls to arrive. Meeting resource demands associated with several low volume and/or unpredictable customer classes (e.g., corresponding with server skill sets) by utilizing servers having multiple skills applicable to those customer classes can aid in smoothing out the work load of the servers by a manageable diversification.

Use of multi-skilled (e.g., cross-trained) servers can increase call traffic into a given server pool, and therefore improve resource utilization. For call centers managing a large number of skills, the problem of determining the mix and quantity of servers for each type of skill over time can be a complex resource allocation problem unless simplified yet restricting assumptions are employed, such as assuming a single skill per server pool.

According to embodiments of the present disclosure, a methodology to address several problems of resource allocation call centers that remove the limitations and assumptions of previous approaches is described. The present approach involves a simulation with optimization, including Monte Carlo and discrete event simulation. More specifically, one or more embodiments of the present disclosure involve an iterative multi skilled staffing approach. Generally, the simulations measure one or more call center quality of service metrics for various resource allocation configurations tested against instances of call center contact arrival and servicing characteristics selected from probability distributions of contact arrival and servicing characteristics, which forecast the arrivals and corresponding contacts serviced. The method of the present disclosure uses the probability distribution of several parameters of the system estimated through simulation to determine the most cost-effective staffing level of corresponding skill sets that fulfills the projected workload of these contacts while satisfying desired service levels (e.g., a probability that calls will be answered within an agreed response time).

Figure 2:
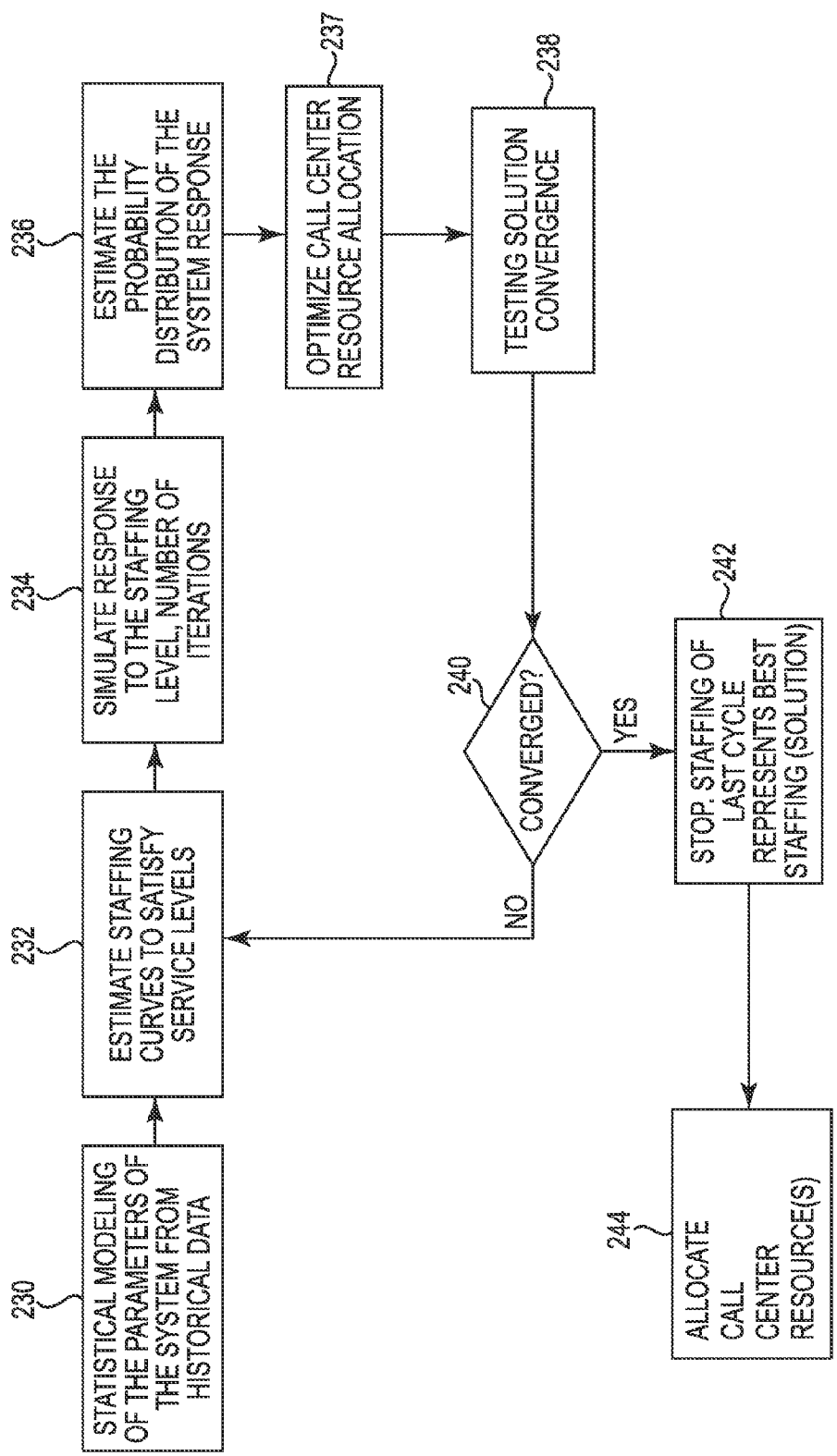
FIG. 2 is a flow chart illustrating an example of a method for determining call center resource allocation according to the present disclosure.

FIG. 2 is a flow chart illustrating an example of a method for determining call center resource allocation according to the present disclosure. First, statistical modeling is done using the parameters of the call center system based on historical data, as shown at 230. Then, at 232, staffing curves are estimated to satisfy service levels. At 234, a response to the staffing level is simulated over a number of iterations, and the probability distribution of the system response is estimated, as shown at 236. Multiple iterations of simulation(s) can be run in order to optimize call center resource allocation, as indicated at 237. Solution convergence is tested at 238 of FIG. 2, and a convergence decision determined at 240. If a solution converges, the process stops. Staffing of the last cycle represents the best solution for staffing the call center, as indicated at 242, and the best staffing solution can be utilized in allocating call center resource(s), as shown at 244. If a solution does not converge, the process loops back to estimate staffing curves to satisfy service levels, as shown at 232. The following description provides more detail to the method for determining call center resource allocation as briefly described with respect to FIG. 2.

Definitions of Parameters

A system such as AVAYA (commercial software to collect data on calls) can be used to build the statistical models of the parameters of the call center from historical data (e.g., 230 in FIG. 2). The call volume is assumed to have intraday variability. The mean of call arrivals (demand) varies with respect to time of day t; typically the intraday period (minute or interval of 15 minutes). The planning horizon is a discrete set of periods [1, T]. Time-varying arrival-rate function is defined as $\{\lambda_{it}, 1 \leq t \leq T\}$ calls per unit of time of customer class i=1, ..., m; and with the assumption that independent and identically distributed (i.i.d.) random service times with $\mu^{-1}$ average service time of the calls. The term $\theta^{-1}$ is defined as the average time to abandonment before the customer is served, reflecting customer impatience in the queue. The number of servers (e.g., call center agents serving customers) at each time t for the period is defined as a sequence of integer values $\{s_t, 1 \leq t \leq T\}$, referred to herein as the resource allocation policy.

Simulation of Call Center

The following is a simplified description of the simulation process, according to the present disclosure, such as that shown in FIG. 2 at 234. First, the interesting activities of a call center are simulated, such as resource allocation input/output (I/O), customer arrivals, routing, service handling, queuing, abandonment, shifts schedules, agent breaks, service completions, customer exits, etc. Each simulation run, or replica, runs over the planning time horizon. For each iteration n=1, 2, ..., created, and in each iteration n of the process, $M^{rep}$ replicas of the simulation are run, each replica with random arrivals following a stochastic arrival process according to a Poisson process. Note that the simulation may generate any arrival distribution of the inter-arrival time for the arrival process, but it will be assumed here that $\lambda_t$ is the mean of a Poisson process (e.g., a probability distribution). In any time period t, the likelihood of having a customer arrival is simulated as $\lambda_t \delta t$, where $\delta t$ is the length of each period which is sufficiently small such that there is no more than one customer arrives in each period. Service time can be similarly simulated with a completion of a customer currently being served having likelihood of $\mu_t \delta t$ over the next period of time $\delta t$. In each iteration convergence is tested, not stopping until a criterion of convergence is successful within the particular simulation.

Multiple simulations (e.g., replicas, iterations) are used to understand the statistical behavior of the stochastic variables listed below. In each iteration n, the stochastic process is defined per period t of the system by:

$N_t^n$=the number of customers being served, $Q_t^n$=the number of customers waiting in the queue, $A_t^n$=the number of abandonments, and $Z_t^n = (N+Q)_t^n$ (total number of customers in the system at t.)

The events occur over the planning horizon as follows: {arrivals of customers, service starts and service completions, abandonments, start and end of shifts}. The above variables are stochastic paths of the system that can be estimated by the simulation. Closed form formulas of these random variables in a real setting are not available, since the system is very complex and intractable to solve. Hence multiple replicas of simulation are used to determine approximations of the distributions of these variables.

Service Levels

A broad definition of service level agreement (SLA) is denoted by a service level agreement SLA($\alpha$, $\delta$). An SLA may include a standard to answer an $\alpha$ fraction of calls to a call center within $\delta$ seconds. For instance, a SLA(0.9, 20) constraint requires answering at least 90% of the calls within 20 seconds of arrival. An SLA(0.8, 120) requires answering 80% of the calls within 120 seconds, etc.

The number of contacts (e.g., customers) in the system is both those in the queue (e.g., waiting to be served) and those being served. Contacts refer to a contact with the call center, such as a telephone call or an electronic message. Since SLA measures quality of service for those contacts in the queue over a maximum delay to be served, a contact in the queue for which the SLA is not satisfied can be quantified. Quantifying the queue can be done in the simulation by tracking delay per contact.

In each simulation and for every t, the quantity of customers waiting in queue can be recorded, and those customers in the queue exceeding the maximum wait time specified by an SLA, $\delta$, can be counted for the purpose of estimating the SLA. If c is assumed to be a customer ID waiting in the queue, $\tilde{Q}_t$ to be a list of customer IDs at time t, and $w(c)=t-t_a(c)$ is the waiting time for customer c (from time of arrival ($t_a$) to time t), then:

$$Q_t(\delta) = \Sigma_{c \in \tilde{Q}} 1_{(w(c) > \delta)}$$

where $Q_t$ denotes the number of customers in the queue that have violated the SLA. The indicator function $$1_{(R)} = \begin{cases} 1, & \text{if condition } R \text{ holds true} \\ 0, & \text{otherwise.} \end{cases}$$

Normally $Q_t$ is a function of $\delta$, but it is omitted in the formulation above for simplicity. However, the dependency is considered in the calculations. Since the simulation records all the events, overall SLA metrics can be estimated by $$\hat{\alpha} = \frac{\sum_{c \in C'} 1_{(w(c) \leq \delta)}}{|C| - \sum_{c \in A} 1_{(w(c) \leq \delta)}}$$

where |C| is the number of customers that arrived during the planning horizon, A is the set of customers who abandon, and C' is the set of customers who do not abandon (C'=C\A, set difference between sets C and A).

Abandonments

According to the above-mentioned customer counting process, customers in queue that eventually abandon are counted if they wait more than $\theta^{-1}$ seconds before leaving a queue, where $\theta^{-1}$ is defined as the average time to abandonment before the customer is served, reflecting customer impatience in the queue. If customers abandon earlier than the maximum waiting time to be served (e.g., $\delta$), the customers will not be counted in the measure of SLA. However, the methods of the present disclosure can be implemented with other conventions regarding counting particular contacts in performance metrics.

A longer SLA maximum wait time increases server utilization at the expense of customer experience. In some cases, like e-mail services, an acceptable response time might be 60 minutes or even more, but the same 60 minutes wait time on the phone might be considered too long and result in a poor service image, and potential loss of good will from affected customers. Another drawback of less stringent SLA criterion is the interaction between maximum wait time and the actual impatience rate of customers.

If a queue wait time is long and customer impatience is high, then the queue can experience a high number of abandonments that can cut effective demand arrival and possibly significant retrials which distort future true demand quantification. Thus the average time to abandonment should be checked to be less than the maximum delay time by a factor: $\theta^{-1} \leq k*\delta$, where k is a safety factor constant, typically greater than 1. If this condition fails, then a flag can be set to indicate the possibility of a large quantity of abandonments due to impatience over long delays. If the above condition fails, both the practicality of the SLA is questionable and the behavior of the algorithm may be unreasonable. Therefore, for the discussion that follows, the inequality above is assumed to be true. One objective is to find the least number of servers at any period t that can handle the workload imposed by the arrivals and that satisfies the quality of service constraints (e.g., set forth in an SLA).

Iterative Staffing of Skillset Algorithm (ISSA)—Single Skill Set Case

In this special case, there is only one skill set with possible multiple skills grouped in a single staffing pool. A single skill set intends a single set of skills, rather than a set involving a single skill. For example, a single skill set can be a single set of 5-7 skills. However, the single set is not so limited, and may be a set having fewer or more skills. Thus, there may be multiple queues feeding multiple customer class contacts into a one pool of resources (NSP=1 in FIG. 1).

To develop the multi-skill staffing method, as used herein, customer class i refers to a class of customers those contact correspond to (e.g., can be addressed by) a particular skill pool. Per conventional notation practices, $\forall_i$ indicates for all i. The term k denotes the staffing pool, with k=1, ..., r, where r=number of staffing pools (NSP), r=NSP as shown in FIG. 1.

The following methodology creates an optimal resource allocation level $\{s_t, 1 \leq t \leq T\}$ and converges in a finite time. First, before the method is started, the following conditions are set:

$$\epsilon := 1, n := 0, N^{rep} = 400.$$

$N^{rep}$ is set large enough to provide a proper sample probability distribution, and may be more or fewer than 400 replicas as appropriate (e.g., 100), although 400 is normally a large enough statistical sampling.

The aggregated arrival rate, $\bar{\lambda}_t = \Sigma_{i=1}^{m} \lambda_{it}$, and the aggregated service rate, $$\bar{\mu}_t = \frac{\sum_{i=1}^{m} \lambda_{it} \mu_i}{\sum_{i=1}^{m} \mu_i},$$

are calculated.

To determine the resource allocation value for the first iteration, two methods may be used. In some cases it is recommended to use the infinite server approximation by setting:

$$S_t^{(0)} = \frac{\bar{\lambda}_t}{\bar{\mu}_t} * M,$$

where M is a big number. In this case M>10 suffices. In the infinite approximation, the output of the first cycle is the number of busy servers, which can be used as a good approximation for a near 100% service level.

A second method to set the initial value of $S_t^{(0)}$ is a closer approximation to the optimal value estimated by the square root staffing formula:

$$S_t^{(0)} = \left\lceil \frac{\bar{\lambda}_t}{\mu_t} + \beta \sqrt{\frac{\bar{\lambda}_t}{\mu_t}} \right\rceil,$$

where the brackets indicate the smallest integer larger than or equal to the number resulting from the sum in the argument. $\beta$ is a service quality factor, which is estimated as follows: let $\Phi(\beta)$ denote the standard normal cumulative distribution (cdf), and considering the SLA $\alpha$ or the quality of service requirement. Then $\beta$ is the value that satisfies $\alpha = 1 - \Phi(\beta)$.

Case r=1. Iterations of $N^{rep}$ replica simulations can progress as follows, starting with n=0:
1. At iteration n, fix $\{_t^{(n)}:1 \leq t \leq T\}$ and simulate $N^{rep}$ replicas, where $S_t^{(n)}$ defines the resource allocation (e.g., staffing of servers) at time t for iteration n.
2. Then build the probability distribution of $Z_t^{(n)}$ for all t, which is the total number of customers in the call center system at t.
3. For each t; $0 \leq t \leq T$, let $S_t^{(n+1)}$ be the least number of servers so that a delay-probability constraint is met at time t, such that:

$s_t^{(n+1)} = \text{argmin}\{b \in N : P(Z_t^n \geq b) \leq \alpha\}$, where N is the set of non-negative integers. Meeting the delay-probability constraint means that the probability of a delay in serving a contact (e.g., customer) before the SLA-specified delay is less than or equal to a target probability.
4. If $\max\{|s_t^{(n+1)} - s_t^{(n)}| : 1 \leq t \leq T\} \leq \epsilon$, then stop. That is, if a maximum difference in optimal staffing level (i.e., resource allocation) between consecutive iterations is less than a stability criterion (e.g., $\epsilon$), then stop further iterations. If not, increment n by 1 (to n+1) and continue with another iteration (e.g., repeat item 1 above).

In order to build the probability distribution in item 2, a histogram is built with the $N^{rep}$ replicas of the simulation. Also, with respect to calculating the probability in item 3, a method of frequency estimation that satisfies a suffices. In a simulation with relatively large sample size, the estimated probability from frequency estimation approximates the true probabilities of the process.

The above-described methodology works for single skill set (single pool), or for multi-skills with homogeneous servers (i.e., each server has the same skill(s)). Construction of probability distributions appropriate to describe the behavior of contact arrivals for item 2 can utilize conventional methods (not described here) in simulation, as long as different seeds are used to generate the arrivals in each replica. Similar methodology can be applied to the simulation of maximum waiting time per customer.

The output of the item 1 simulation is used in item 2 to estimate the probability distributions of the stochastic path of customers (e.g., contacts) in the system. Item 3 carries out a search in the probability distribution, and a convergence criterion (e.g., indicative of stability) is tested in item 4. The methodology described above tends to converge quickly in practical problems. However, limitations of this approach are that it works for a single skill, and neglects scheduling constraints. These limitations are addressed in the following discussions.

Constraining Customer Abandonments

The above-described methodology includes the SLA constraint (e.g., $\alpha$) in item 3. Alternatively, a maximum number of abandonments can be introduced as a quality of service constraint. An SLA with a cap on the quantity of abandonments can be denoted by SLA $(\alpha, \delta, \alpha_2)$, where $\alpha_2$ is the fraction of admissible abandonments:

$$\frac{A_t}{Z_t} \leq \alpha_2, \text{ or } Z_t \geq \frac{A_t}{\alpha_2}.$$

To satisfy SLA $(\alpha, \delta, \alpha_2)$ the constraint equation:

$$Z_t^n = \max\left(\frac{A_t}{\alpha_2}, N_t + Q_t(\delta)\right)$$

can be used. By default, $\delta=0$, and $\alpha_2=1$, which implies the requirement is zero delay and abandonment behavior can be ignored. According to the formula for $Z_t^n$ shown above, Z can be interpreted as the total number of customers (e.g., contacts) in the system. However, $Z_t^n$ could also indicate a cap to the total number of customers (e.g., contacts) in the system that would yield an acceptable abandonment SLA percentage.

Iterative Multi Skill Allocation (IMSA) Method

The ISSA described in the previous section is able to address the Markovian time dependent, with general behavior of service time kind of queue, where the number of servers is scheduled (e.g., fixed but varies with time), accounting for certain other parameters such impatience (e.g., $M_t/G/s_t+G$) queue model with abandonment rate, and varying arrival rates in a single skill environment. More generally, the ISSA is assumed to be able to address any complex queuing aspect of the contact centers, such as retrials, agents flexibility in their schedule, etc., as long as these features are simulated. However, to do so issues should be addressed on search and estimation of statistical distributions. The previous model addresses multiple skills with homogeneous servers, each server capable of handling any customer class.

The multi-skilled problem is addressed next. Some assumptions are laid out that are considered natural or not too restrictive. Let m be the number of heterogeneous customer class arrivals, each customer class i=1, ..., m requires a server to hold a corresponding skill. Denote by $\Phi_k$ a skill set capability of staffing group k (also the combination of customer classes that can be served). Thus, a skill group k is also a pool of homogeneous servers, k=1, ..., r, each with a distinct skill set distinct from that of any other group.

Denote:
1. The customer class arrival rate functions by $\{\lambda_{it}, 1 \leq t \leq T\}$, i=1, ..., m
2. Servers in pool k=1, ..., r, per period t by $s_{kt} \geq 0$
3. Skill set $\Phi_k = \{\text{skill i:i can be served by } k \in \{1, ..., r\}, \text{ and } i \in \{1, ..., m\}\}$
4. (i.i.d.) random service times with mean $\mu_{ik}^{-1}$ by pool k for customer class i
5. The resource allocation vector by $\{s=(s_1 s_2 ... s_t), s \in N^r\}$ $N^r$ is a vector of integers
6. Family of resource allocation functions by $\{s_t=(s_{1t} s_{2t} ... s_{rt}), s_t \in N^r\}$, $t \in [1, N]$, where $N^r$ is the set of non-negative integers in r dimension (or a vector of r values).

Simulation of Events with Multi Skill Based Routing

Now the simulation can be extended to a multi skill environment with any number of staffing groups and arbitrary routing flow. The simulation in a multi skill environment can be defined by routing jobs to servers trained for particular skills. The rules to select an agent from among multiple skill sets can be assigned according to different priority mechanisms. In FIFO, the longest waiting time job is assigned to the first available server. The first arriving job is assigned to the longest idle server.

According to a Primary/Secondary role implementation, the FIFO rule applies first to agents assigned as primary roles. If no primary role is found, then secondary role agents are searched and assigned. For every skill i; and pool k;
the events required in the simulation include:
1. {customers arrival by class i}
2. {customers service start by class i, assigned to an agent in pool k}
3. {service completion of class i, performed by k}
4. {customers abandonment by class i}
5. {shifts of agents begin/end by pool k}

Note that a router implementing any arbitrary policy is also simulated to allow flow of contacts between item 1 and item 2 above. The simulator performing these steps also records the data from events for each of the $M^{rep}$ simulations replicas to estimate the probability distributions of the several variables described in next section.

Stochastic Processes Estimation

According to one or more embodiments of the present disclosure, service levels can be estimated as follows. For every iteration n, the simulation can be run with $M^{rep}$ replicas, each replica under a fix staffing curve $\{s_t = (s_{1t}\ s_{2t}\ \ldots\ s_{rt})$, $s_t \in N^r\}$, $t \in [1,N]$. For each customer class, three processes or paths can be defined within the simulation:

$N_{ikt}^{(n)}$ = the number of customers of class i being served by skill pool k at t, $Q_{it}^{(n)}$ = the number of customers of class i waiting in its queue, $A_{it}^{(n)}$ = the number of abandonments of class i from its queue.

In the following section two network functions are used. If a queue i is connected to pool k, then $i \in \phi_k$. Also, the set of server pools connected to a queue is denoted by $k(i) = \{k : i \in \phi_k\}$.

Meeting Service Level Constraints by Customer Class

The most common and critical objective in operating contact centers is to minimize resource allocation while satisfying the SLA for each customer class. Let $X_i$, $i = 1, \ldots m$ denote the distribution of servers required to serving customer class i can be estimated by using the skill based routing simulation stochastic processes and $N_{ikt}^{(n)}$ and $Q_{it}^{(n)}$. This allocation is equivalent to the number of servers working in each class plus the contacts waiting in its corresponding queue at time t $$X_{it} = \sum_{k \in k(i)} N_{ikt}^{(n)} + Q_{it}^{(n)}, \quad i = 1, \ldots, m. \tag{1}$$

Thus, the minimum number of servers needed by class to meet the service levels is:

$$y_{it} = \arg\min\{b \in N : P(X_{it}^{(n)} \geq b) \leq \alpha_i\}, \forall i; \forall t. \tag{2}$$

The value $y_{it}$ is the number of servers required by class i. Servers are grouped by pools. The network of the routing flow (e.g., illustrated in FIG. 1) permits the pools to combine resources to fulfill the number of servers needed per class, which can be translated into servers assigned to server pools. This is necessary because the server pools to be scheduled generally will have a skill set with more than one skill. To allocate the servers required in each server pool the flow of contacts can be allowed to be assigned proportionally to the capacities of server pools interconnected to each class, which can be approximated by:

$$x_{kt} = \sum_{i \in \phi_k} \left( y_{it} \frac{s_{kt}^{(n)} \mu_{ik}}{\sum_{j \in k(i)} s_{jt}^{(n)} \mu_{ij}} \right), \forall k; \forall t, \_ \tag{3}$$

where $k(i) = \{k : i \in \phi_k\}$. Since the allocation is approximated from current staffing curves $s_{kt}^{(n)}$, $s_{kt}^{(n+1)}$ is the new allocation (or the allocation to be used in next iteration in the algorithm).

Imposing Service Level Constraints to Server Pools

Sometimes customers do not demand strict SLAs, but the service provider nonetheless imposes service levels to the staffing to pursue excellence. Various SLAs can be defined per server pool, in order to segment manpower by various quality of service. To obtain the minimal staffing of server pools subject to an imposed SLA constraint on each server pool, a similar process to that shown in previous section is replicated.

Let $Z_t = (Z_{1t}, Z_{2t}, \ldots, Z_{rt})$ denote the distribution of customers in the system "allocated" to each pool $k = 1, \ldots, r$ in period t. To calculate the allocation of customers, the number of customers from each class being served by each pool $N_{ikt}$) is used directly, and the number of customers from each queue are re-allocated to each pool.

The customers in m queues are re-allocated to r pools as follows. Again, the queue is allowed to flow to servers proportionally to pools capacity:

$$Q_{it}^{(n)} \frac{s_{kt}^{(n)}}{\sum_{j \in k(i)} s_{jt}^{(n)}}, \quad i = 1, \ldots, m. \tag{4}$$

The queue i is allocated to server k proportionally to a network capacity. By definition, the total allocation of all queues to server k is sum of each allocated queue served by k, as follows:

$$Z_{kt}^{(n)} = \sum_{i \in \phi_k} N_{ikt}^{(n)} + \sum_{i \in \phi_k} Q_{it}^{(n)} \left( \frac{s_{kt}^{(n)} \mu_{ik}}{\sum_{j \in k(i)} (s_{jt}^{(n)} \mu_{ij})} \right), \forall k; \forall t \tag{5}$$

The rationale for such an allocation is that contacts will be allocated to servers proportionally to their capacity, and to the service rate (speed to service); logically, the probability that a customer will find an available server depends on capacity and how soon it is released. Hence, the minimum pool size that meets each skill pool's delay-probability $\alpha$ is:

$$z_{kt} = \arg\min\{b \in N : P(Z_{kt} \geq b) \geq \alpha\}, \forall k; \forall t \tag{6}$$

The terms (3) and (6) identify the resource allocation requirements to fulfill the SLA constraints by class and server pools respectively. In most practical situations, it is only critical to meet the SLA contractually required by customer classes, while the need to meet the SLA by pool bears on managerial needs. These values can be non-integers because fractional allocation is permissible. If only customer class SLA constraint is critical, then Z can be set equal to zero. Potentially, one or more pools may have a lower than expected service level; however, but as a result will experience greater utilization levels.

Iterative Multi Skill Allocation (IMSA) Algorithm

The general case is where r>1, or it involves a multiple skill set according to a general network of customer classes connected to any collection of skill sets. The topology of the network is assumed to be defined by a finite collection of skill sets, as many as server pools, and each with any combination of skills. According to embodiments of the present disclosure, an iterative approach can be used to check on SLA fulfillment for every queue. If a large initial resource allocation is initially used (e.g., for a first iteration), the end of the first iteration in the algorithm shall provide the solution of the infinite server approximation ($S_t^{(1)}$).

1. Setup is started. To determine the first resource allocation value, two methods can be used. For an infinite server approximation, a loose bound can be used such as:

$$s_{kt}^{(0)} = M * \sum_{i \in \phi(k)} \frac{\lambda_{it}}{|k(i)|\mu_{ik}}, \forall k, t$$

where usually M>10 and |k(i)| is the number of elements in the set, i.e. the number of servers that can serve the class i. The square root formula can be applied as follows. Let $$L_{kt} = \frac{1}{|k(i)|} \sum_{i \in \phi(k)} \frac{\lambda_{it}}{\mu_{ik}},$$

$\forall k,t$, then $$s_{kt}^{(0)} = [L_{kt} + \beta(\overline{\alpha}_k)\sqrt{L_{ky}}], \forall k,t$$

with $\overline{\alpha}_k$ estimated as the average of the SLA served by the group. That is $$\overline{\alpha}_k = \frac{\sum_{i \in \phi_k} \alpha_i}{|\phi_k|}.$$

Note that the use of the square root formula gives a tighter bound to the optimal solution, and thus converges much faster.

Set $\xi:=1$, and n:=1, and $M^{rep}=400$ replications per iteration.

2. During iteration n of the simulation, fix:

$$S_t^{(n)} = \{(s_1, s_2, \ldots, s_t)_n 1 \leq t \leq T\}$$

3. Evaluate the probability distributions of the stochastic processes:
$X_i$, i=1, ..., m from paths $N_{ikt}^{(n)}$ and $Q_{it}^{(n)}$, provided by equation (1) above.

4. For each t; $1 \leq t \leq T$; let $S_k^{n+1}$ be the least number of servers that meet delay-probabilities that satisfy customer class service level calculated by equation (3), derived from the equations (1) and (2).

5. If Max $\{|t^{(n+1)} - S_t^n| : 1 \leq t \leq T\} \leq \epsilon$, then stop, and let $S^{n+1}$ be the best solution. Otherwise replace $S^n$ by $S^{n+1}$ and repeat item 2 above.

To meet service level imposed to resources in item 4 equation (6) is used instead of equation (3), to calculate $S^{n+1}$ the staffing of next iteration, which in turn requires equations (4) and (5).

Minimizing Resource Allocation Cost

When the cost of the resource allocation level is known and dependent on a particular skill group, or time of day (e.g., overnight shifts), then it make sense to minimize total cost as opposed to minimize total headcount. The methodology can be adjusted to consider for optimizing total cost as follows, including resource allocation. The cost per skill group k in period t is $c_{kt}$. The term $x_{ikt}$ is defined as the allocation of the servers from pool k into serving the customers of class i required to fulfill the SLA in period t. The following linear program can be used to choose the cost efficient allocation for all periods and all server pools:

Linear Programming (LP) Model:

$$\min \sum_{t=1}^{T} \sum_{k=1}^{r} c_{kt} \sum_{i \in \phi_k} x_{ikt} \quad (7)$$

$$\sum_t \sum_{k \in k(i)} x_{ikt} \geq y_{it}, \forall i \quad (8)$$

$$x_{ikt} \geq 0.$$

$$y_{it} = \operatorname{argmin}\{b \in N : P(X_{it}^{(n)} \geq b) \leq \alpha_i\}, \forall i; \forall t$$

The value for $y_{it} \geq 0$, is determined by the equation (2).

The LP can be used in the IMSA method. Item 4 is replaced in the IMSA method by item 4a and 4b as follows:

4a. After completing the simulations (item 2), and constructing the probability distribution of X (item 3), calculate $y_{it} \geq 0$, according to the equation (2) above, and use it to build the set of constraints in the LP Model.

4b. Solve the LP model by using any solver, such as CPLEX or open source solver. Let $x_{ikt}^* = \arg \min TC$, $\forall ikt$, then calculate the staffing curve for next iteration by:

$$s_{kt}^{(n+1)} = \sum_{i \in \phi_k} x_{ikt}^*, \forall k,$$

where $x_{ikt}^* = \operatorname{argmin}$ the LP Model, $\forall kt$

There are several advantages when using the LP model within IMSA. One, if there are different cost per type of resources, because of the skills involved, then this is an accurate method to minimize total costs. Also, it is possible to introduce a rich set of business variables in the LP model, which can depend on the business setting, for instance, smoothing out staffing, limiting number of resources per group, etc. The formulation above is the simplest that can efficiently solve the resource allocation problem.

IMSA with Scheduling Costs

In this method scheduling constraints are introduced in the methods discussed previously above, the optimal resource allocation curve was developed, such that a scheduler could be used to assign servers to shifts. Such a problem can be solved by using a bin packing problem approach where the resource allocation curve is aggregated from the shifts to satisfy at least the optimal resource allocation created by the IMSA.

Although this process is simpler and faster, it creates a gap in optimally when scheduling is restrictive. In order to reduce this gap the joint resource allocation/scheduling problem is solved as follows. Define A as a matrix that defines all the permissible shifts that can be assigned to any agent. A equals an NS×T-dimensional matrix, where NS is equal to the number of shifts. Thus, $a_{j,t}=1$ if shift j is operating in period t, otherwise $a_{j,t}=0$. Define $b_{j,k}$ as the number of servers from skill group k scheduled to work into shift j. Define $c_{j,k}$ as the cost of a server in group k assigned for the shift j. The scheduling problem can then be formulated as follows:

LP2 Model $$\min \sum_{j=1}^{NS} \sum_{k=1}^{r} c_{jk} b_{jk}$$

$$\sum_{j=1}^{NS} a_{ji} b_{jk} \geq \sum_{i \in \phi_k} x_{ikt}, \forall k, t$$

$$\sum_{k=1}^{r} x_{ikt} \geq y_{it}, \forall i, t$$

$$0 \leq x_{ikt} \leq M$$

The value for $y_{it} \geq 0$, is determined by the equation (2), and where M is any sufficiently large number; $x_{ikt}$ is the allocation of server capacity from server pool k into customer class i at period t. In this case the variables for allocation are auxiliary variables derived from two set of constraints. The first set of constraints indicate that server capacity can not be allocated from a server pool k to a customer class i more than the resources scheduled in such a pool. The second set of constraints indicate that enough server capacity must allocated from every possible pool into such a customer class, in order to satisfy the quantity γ required to meet the service levels.

The LP2 can be used in the IMSA method. Item 4 can be replaced in the IMSA method as follows: 4+LP2. After completing the simulations in each iteration, calculate $y_{it} \geq 0$, according to the equation for $y_{it}$ above, and use it to build the LP2 model. The LP model can be solved by using any solver, such as CPLEX or any open source solver. The staffing curve can be set for the next iteration cycle from the optimal solution in the LP:

$$s_{kt}^{(n+1)} = \sum_{j=1}^{NS} b_{jk}^* a_{jt}, \forall k,$$

where $b_{jk}^*$ = argmin the LP2 Model, ∀ jk

The solution of the LP above can be fed into IMSA similar to that described as above. This problem can be more difficult to solve than that in LP1, so it may require multiple iterations to yield stable results. To alleviate this issue the epsilon value can be relaxed in item 5 of the IMSA method. The output of this method can be directly the agents scheduled at specific time shift, which can include break time windows properly input in $a_{jt}$. For instance, an epsilon value of 2 may be allowed for a fraction of periods to speed up convergence without sacrificing significantly optimality.

Figure 3:
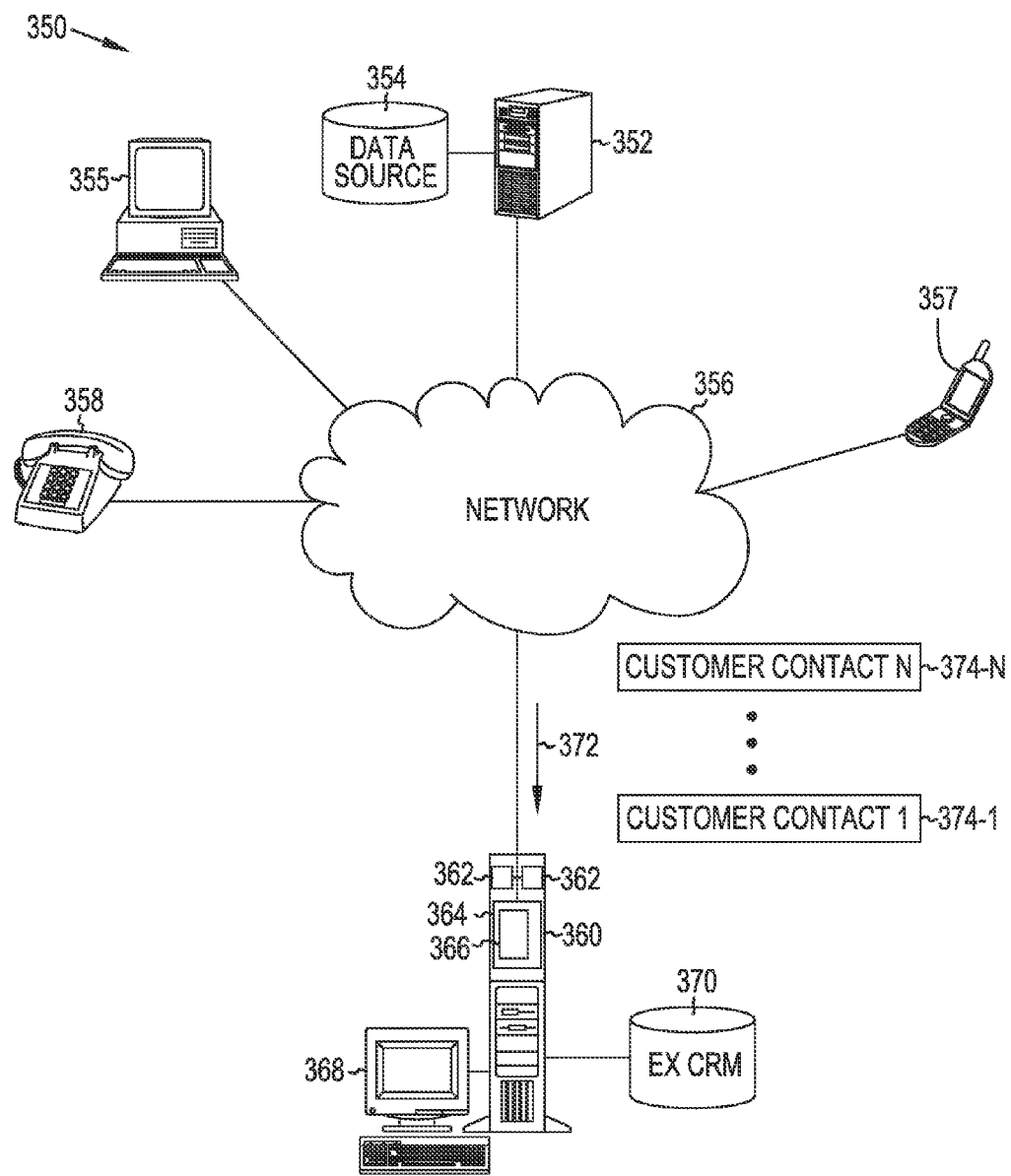
FIG. 3 illustrates a block diagram of an example of a computing system for determining call center resource allocation according to the present disclosure.

FIG. 3 illustrates a block diagram of an example of a computing system for determining call center resource allocation according to the present disclosure. The computing system 350 can be comprised of a number of computing resources communicatively coupled to the network 356. FIG. 3 shows a first computing device 352 that may also have an associated data source 354, and may have one or more input/output devices (e.g., keyboard, electronic display). A second computing device 360 is also shown in FIG. 3 being communicatively coupled to the network 356, such that executable instructions may be communicated through the network between the first and second computing devices.

Second computing device 360 may include one or more processors 362 communicatively coupled to a non-transitory computer-readable medium 364. The non-transitory computer-readable medium 364 may be structured to store executable instructions 366 (e.g., one or more programs) that can be executed by the one or more processors 362 and/or data. The second computing device 360 may be further communicatively coupled to a production device 368 (e.g., electronic display, printer, etc.). Second computing device 360 can also be communicatively coupled to an external computer-readable memory 370. The second computing device 360 can cause an output to the production device 368, for example, as a result of executing instructions of one or more programs stored non-transitory computer-readable medium 364, by the at least one processor 362, to implement a system for determining call center resource allocation according to the present disclosure. Causing an output can include, but is not limited to, displaying text and images to an electronic display and/or printing text and images to a tangible medium (e.g., paper). Executable instructions to determine call center staffing may be executed by the first 352 and/or second 360 computing device, stored in a database such as may be maintained in external computer-readable memory 370, output to production device 368, and/or printed to a tangible medium.

One or more computers 355 (e.g., customer-owned computers), telephones 358, and/or portable communication devices 357, used to communicate with a call center, may also be communicatively coupled to the network 356. Computers 355, telephones 358, and/or portable communication devices 357 may be communicatively coupled to the network 356 via a communication link that includes a wireless portion. The telephones 358 and/or portable communication devices 357 may be computing devices, and/or may include processing resources. For example, a call center contact (e.g., 374-1, . . . , 374-N) may be originated by a customer on one of a computer 355, telephone 358, and/or portable communication device 357, and routed through the network to the second computing device 360, which may implement a call center and/or a system for determining call center resource allocation. First 352 and second 360 computing devices are communicatively coupled to one another through the network 356. While the computing system is shown in FIG. 3 as having only two computing devices, the computing system can be comprised of additional multiple interconnected computing devices, such as server devices and/or clients. Each computing device can include control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., 354, 364, 370). The non-transitory computer-readable medium can be integral (e.g., 364), or communicatively coupled (e.g., 354, 370), to the respective computing device (e.g. 352, 360), in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), high definition digital versatile discs (HD DVD), compact discs (CD), laser discs, and magnetic media such as tape drives, floppy discs, and hard drives, solid state media such as flash memory, EEPROM, phase change random access memory (PCRAM), as well as other types of machine-readable media.

Figure 4:
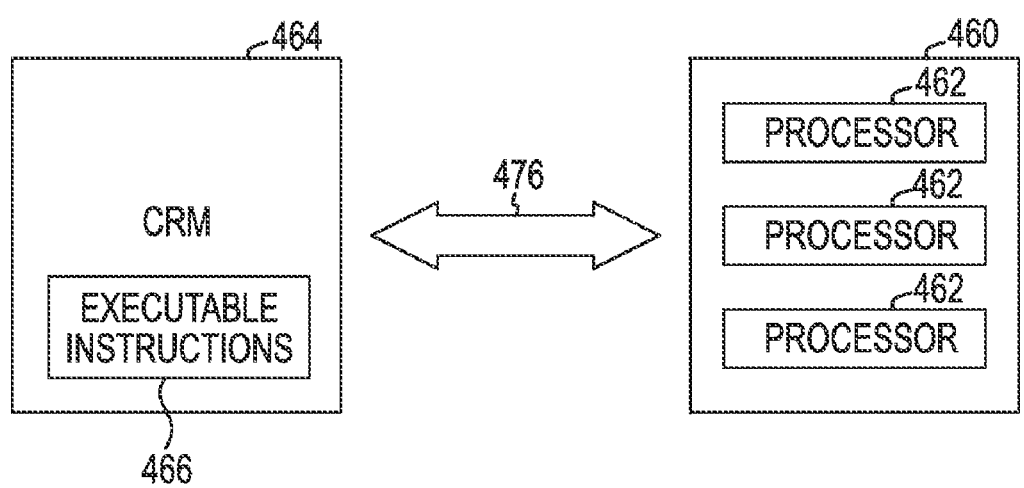
FIG. 4 illustrates a block diagram of an example of a computer readable medium (CRM) in communication with processing resources according to the present disclosure.

FIG. 4 illustrates a block diagram of an example of a computer readable medium (CRM) 464 in communication with processing resources 460 according to the present disclosure. As used herein, processor resources 460 can include one or a plurality of processors 462 such as in a parallel processing arrangement. A computing device having processor resources can be in communication with, and/or receive a tangible non-transitory computer readable medium (CRM) 464 storing a set of computer readable instructions 466 (e.g., software) for allocating call center resources, as described herein.

As used herein, the indefinite articles "a" and/or "an" can indicate one or more than one of the named object. Thus, for example, "a processor" can include one processor or more than one processor. Processor resources can be also be control circuitry that can have a structure that provides a given functionality, and/or execute computer-readable instructions that are stored on an internal or external non-transitory computer-readable medium. Non-transitory computer-readable medium (e.g., 464), as used herein, can include volatile and/ or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), high definition digital versatile discs (HD DVD), compact discs (CD), and/or a solid state drive (SSD), flash memory, etc., as well as other types of machine-readable media.

The non-transitory computer-readable medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium can have computer-readable instructions stored thereon that are executed by the processing resources (e.g., control circuitry, processor(s)) to provide a particular functionality.

The CRM 464 can be in communication with the processing resources 460 via a communication path 476. The communication path 476 can be local or remote to a machine associated with the processing resources 460. Examples of a local communication path 476 can include an electronic bus internal to a machine such as a computer where the CRM 464 is one of volatile, non-volatile, fixed, and/or removable storage medium in communication with the processing resources 460 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 476 can be such that the CRM 464 is remote from the processing resources 460 such as in the example of a network connection between the CRM 464 and the processing resources 460 (e.g., the communication path 476 can be a network connection). Examples of such a network connection can include a local area network (LAN), a wide area network (WAN), a personal area network (PAN), the Internet, among others. In such examples, the CRM 464 may be associated with a first computing device (e.g., a server) and the processing resources 460 may be associated with a second computing device (e.g., a client). The first and second computers can be in communication via a networked communication path 476.

Logic can be used to implement the method(s) of the present disclosure, in whole or part. Logic can be implemented using appropriately configured hardware and/or software. For example computers implementing a call center and or analysis thereof can include logic to determine call center resources staffing.

The above-mention logic portions may be discretely implemented and/or implemented in a common arrangement. Furthermore, the above-mention logic portions may be included in one or more computing devices communicatively coupled to the network device, which are arranged as a call center and/or to provide resources for determining call center resource allocation.

Figure 5:
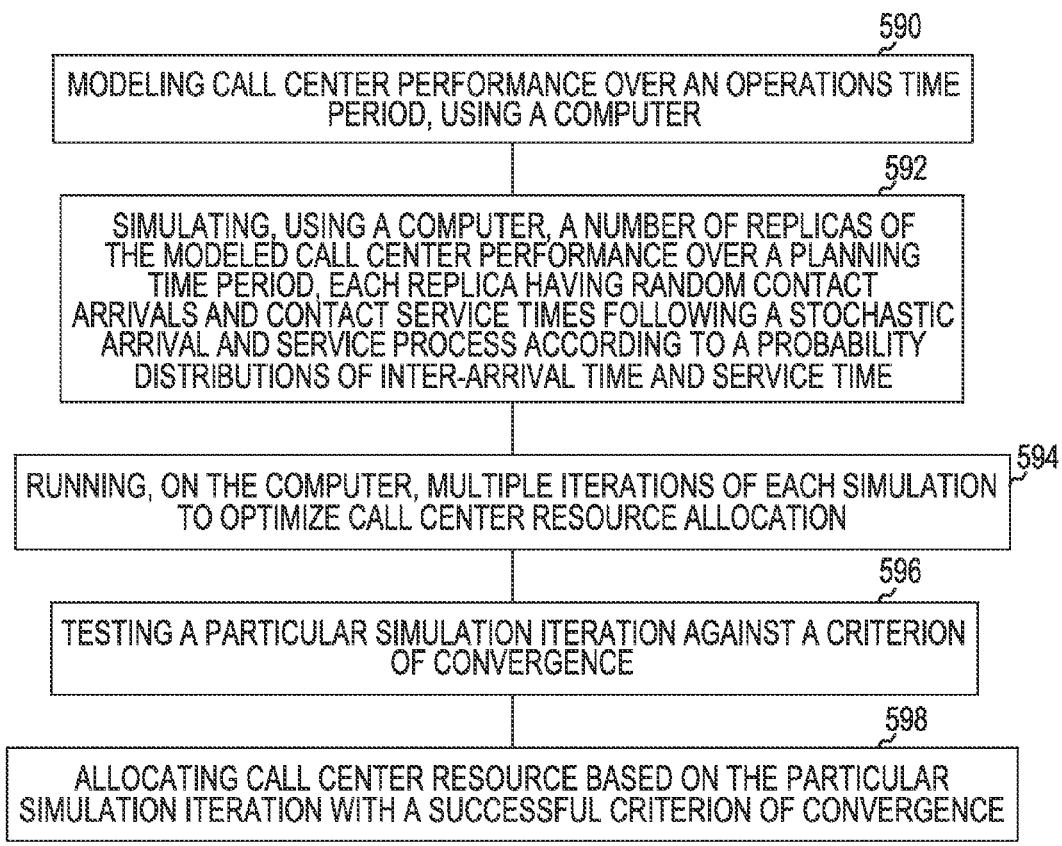
FIG. 5 is a flow chart illustrating an example of a method for determining call center resource allocation according to the present disclosure.

FIG. 5 is a flow chart illustrating an example of a method for determining call center resource allocation according to the present disclosure. As shown at 590, the method can include modeling call center performance over an operations time period, including: contact arrivals, contact classification corresponding to at least one of multiple skill pools, queuing order, queuing time, contact routing to a queue associated with one of multiple skill pools based on contact classification, staffing of the multiple skill pools with servers, contact assignment from the queue to a particular server associated with one of multiple skill pools, contact service time, and abandoned contacts. A number of replicas of the modeled call center performance are simulated over a planning time period, each replica having random contact arrivals and contact service times following a stochastic arrival process according to a probability distribution, as indicated at 592. Multiple iterations of each simulation are run, as indicated at 594. A particular simulation iteration is tested against a criterion of convergence, and illustrated at 596, stopping when the criterion of convergence is successful within the particular simulation iteration, as shown at 598.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for call center resource allocation have been described in detail with reference to the drawings, where like reference numerals represent like parts and assemblies throughout the several views. Reference to various examples does not limit the scope of the system and method for call center resource allocation, which is limited just by the scope of the claims attached hereto. Additionally, any examples set forth in this specification are not intended to be limiting and merely set forth some of the many possible examples for the claimed system and method for call center resource allocation.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment," as used herein does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "N," "M," and "X" particularly with respect to reference numerals in the drawings, indicate that a number of the particular feature so designated can be included with examples of the present disclosure. The designators can represent the same or different numbers of the particular features.

The figures attempt to follow a numbering convention in which the first digit or digits correspond to the drawing figure number and the remaining digits identify an element or component in the drawing. Similar elements or components between different figures may be identified by the use of similar digits. For example, 366 may reference element "66" in FIG. 3, and a similar element may be referenced as 466 in FIG. 4. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

In the Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for determining call center resource allocation, comprising:
   modeling call center performance over an operations time period using a computer;
   simulating, using the computer, a number of replicas of the modeled call center performance over a planning time period, each replica having random contact arrivals and contact service times following a stochastic arrival and service process according to probability distributions of inter-arrival time and service time;
   running, on the computer, multiple iterations of each simulation to optimize call center resource allocation;
   testing a particular simulation iteration against a criterion of convergence; and
   allocating call center resource based on the particular simulation iteration with a successful criterion of convergence.

2. The method as set forth in claim 1, wherein the call center performance includes: contact arrivals, contact classification corresponding to at least one of multiple skill pools, queuing order; queuing time, contact routing to a queue associated with one of multiple skill pools based on contact classification, staffing of the multiple skill pools with servers, contact assignment from the queue to a particular server associated with one of multiple skill pools, contact service time, and abandoned contacts.

3. The method as set forth in claim 1, wherein events included in a simulation of the modeled call center performance for every server skill i, and skill pool k, include: contact arrival by i; contact service start time by i, k; contact service completion time by i, k; customers abandonment by i; and server shift beginning and end times by k; server (k).

4. The method as set forth in claim 1, further comprising:
   constraining the model to satisfy a service level agreement (SLA), the SLA including at least a percentage of contacts ($\alpha$) be addressed in a specified queuing time; and
   constraining the model to satisfy the SLA for each one of multiple skill pools.

5. The method as set forth in claim 4, further comprising, for each of the multiple skill pools, determining a minimum pool size to at least meet a delay probability to satisfy the SLA, the minimum pool size $z_{kt}$ being:

$$Z_{kt} = \arg\min\{b \in N : P(Z_{kt} \geq b) \leq \alpha\}, \forall k; \forall t$$

wherein a distribution of contacts in the call center model allocated to each pool at time t for iteration n is $Z_t = (Z_1, \ldots, Z_r)_t^{(n)}$, and $$Z_{kt}^{(n)} = \sum_{i \in \phi_k} N_{ikt}^{(n)} + \sum_{i \in \phi_k} Q_{it}^{(n)} \left( \frac{s_{kt}^{(n)} \mu_{ik}}{\sum_{j \in k(i)} (s_{jt}^{(n)} \mu_{ij})} \right) \forall k; \forall t$$

and $$Q_{it}^{(n)} \frac{s_{kt}^{(n)}}{\sum_{j \in k(i)} s_{jt}^{(n)}}, i = 1, \ldots, m$$

for server k, i possible server skills, and j skill pools.

6. The method as set forth in claim 4, further comprising determining a minimum number of servers for each contact classification to satisfy the SLA, the minimum number of servers $y_{it}$ for each contact classification being:

$$y_{it} = \arg\min\{b \in N : P(x_{it}^{(n)} \geq b) \leq \alpha_i\}, \forall i; \forall t$$

wherein a distribution of servers allocated to each of m contact classifications at time t for iteration n is $X_t = (X_1, \ldots, X_m)_t^{(n)}$, and $$x_{it} = \sum_{k \in k(i)} N_{ikt}^{(n)} + Q_{it}^{(n)}, i = 1, \ldots, m.$$

for server k, and i possible server skills.

7. The method as set forth in claim 6, further comprising determining a minimum number of servers to assign to each of j skill pools $$x_{kt} = \sum_{i \in \phi_k}\left(y_{it} \frac{s_{kt}^{(n)} \mu_{ik}}{\sum_{j \in k(i)} s_{jt}^{(n)} \mu_{ij}}\right), \forall k; \forall t \text{ where } k(i) = \{k : i \in \phi_k\}$$

for server k, and wherein p is a respective weighted proportionality allocation constant.

8. The method as set forth in claim 1, further comprising determining, for a loose bound, an initial staffing value $s_{kt}$ at a first iteration of a simulation replica for skill pool k at time t as $$s_{kt}^{(0)} = M * \sum_{i \in \phi(k)} \frac{\bar{k}(i)\lambda_{it}}{\mu_{ik}}, \forall k, t \text{ where } M > 10, \bar{k}(i) = M * \frac{1}{|k(i)|}$$

and |k(i)| is the number of servers that can serve the class i, and where t is obtained by forecasting an interval to obtain an infinite server approximation solution for staffing levels after a first iteration.

9. The method as set forth in claim 1, further comprising:
determining, for a tight bound, an initial staffing value $s_{kt}$ at a first iteration of a simulation replica for skill pool k at time t as $$s_{kt}^{(0)} = \lceil L_{kt} + \beta(\bar{\alpha}_k)\sqrt{L_{ky}}\rceil, \forall k, t \text{ where } L_{kt} = \frac{1}{|k(i)|}\sum_{i \in \phi(k)} \frac{\lambda_{it}}{\mu_{ik}},$$

$\forall k, t$ and |k(i)| is the number of servers that can serve the class i, and where t is obtained by forecasting an interval, with $\bar{\alpha}_k$ estimated as the average of the SLA served by the group;

fixing $S_t^{(n)} = \{(s_1, s_2, \ldots, s_r)_t, 1 \leq t \leq T\};$ evaluating probability distributions of stochastic processes $X_1, i=1, \ldots, m$ from paths $N_{ikt}^{(n)}$ and $Q_{it}^{(n)}$ according to $$X_{it} = \sum_{k \in k(i)} N_{ikt}^{(n)} + Q_{it}^{(n)}, i = 1, \ldots, m;$$

letting, for each t; $1 \leq t \leq T$, $S_k^{n+1}$ be a least number of servers that meet delay-probabilities that satisfy customer class service level calculated by $$x_{kt} = \sum_{i \in \phi_k}\left(y_{it} \frac{s_{kt}^{(n)} \mu_{ik}}{\sum_{j \in k(i)} s_{jt}^{(n)} \mu_{ij}}\right),$$

stopping if $\text{Max}\{|S_t^{(n+1)} - S_t^n| : 1 \leq t \leq T\} \leq \epsilon$, with $S^{n+1}$ being the particular simulation iteration with the successful criterion of convergence.

10. The method as set forth in claim 1, further comprising determining a minimum cost of staffing the multiple skill pools with servers over time T as $$\min \sum_{t=1}^{T} \sum_{k=1}^{r} c_{kt} \sum_{i \in \phi_k} x_{ikt}$$

$$\text{where } \sum_{t} \sum_{k \in k(i)} x_{ikt} \geq y_{it}, \forall i \text{ and } s_{kt}^{(n+1)} = \sum_{i \in \phi_k} x_{ikt}^*,$$

$\forall k$ and
wherein $x_{ikt}$ is an allocation of servers from skill pool k to satisfy a service level agreement in period t and is a positive integer, and the cost per skill pool k in period t is $c_{kt}$.

11. The method as set forth in claim 1, further comprising further comprising determining a minimum cost of scheduling the multiple skill pools with servers as $$\min \sum_{j=1}^{NS} \sum_{k=1}^{r} c_{jk} b_{jk}$$

$$\text{where } \sum_{j=1}^{NS} a_{jt} b_{jk} \geq \sum_{i \in \phi_k} x_{ikt}, \forall k, t \text{ and } \sum_{k=1}^{r} x_{ikt} \geq y_{it}, \forall i, t$$

and wherein the cost per skill pool k in period t is $c_{kt}$ and $X_{ikt}$ is an allocation of servers from skill pool k to satisfy a service level agreement in period t and is a positive integer that satisfies $0 \leq x_{ikt} \leq M$.

12. A non-transitory computer-readable medium having computer-readable instructions stored thereon that, if executed by one or more processors, cause the one or more processors to:
model call center performance over an operations time period, call center performance including:
staffing of multiple skill pools with servers, some servers having skills corresponding to more than one of the multiple skill pools, and
contact assignment from the queue to a particular server associated with one of multiple skill pools;
simulate a number of replicas of the modeled call center performance over a planning time period, each replica having random contact arrivals and contact service times following a stochastic arrival process according to a Poisson probability distribution;
run on the computer multiple iterations of each simulation to optimize call center resource allocation;
test a particular simulation iteration against a criterion of convergence; and
allocate call center resource based on the particular simulation iteration with a successful criterion of convergence.

13. The non-transitory computer-readable medium of claim 12, further having computer-readable instructions stored thereon that, if executed by one or more processors, cause the one or more processors to assign a contact to a particular server associated with one of multiple skill pools based on first-in, first-out (FIFO) rules, wherein a particular contact is assigned to a first available server associated with the one of multiple skill pools, and a contact routed earliest to a queue associated with one of multiple skill pools is assigned to a longest idle server.

14. The non-transitory computer-readable medium of claim 12, further having computer-readable instructions stored thereon that, if executed by one or more processors, cause the one or more processors to assign a contact to a particular server associated with one of multiple skill pools based on primary/secondary roles rules, wherein the FIFO rules are applied first to servers associated with the one of multiple skill pools as a primary role, and if a server associated with the one of multiple skill pools as a primary role is not available then the FIFO rules are applied second to servers associated with the one of multiple skill pools as a secondary role.

15. A system for assigning support in a customer support system comprising: processor executing computer readable instructions to model call center performance over an operations time period, call center performance including: contact arrivals, contact classification corresponding to at least one of multiple skill pools, queuing order, queuing time, contact routing to a queue associated with one of multiple skill pools based on contact classification, staffing of the multiple skill pools with servers, contact assignment from the queue to a particular server associated with one of multiple skill pools, contact service time, and abandoned contacts; processor executing computer readable instructions to simulate a number of replicas of the modeled call center performance over a planning time period, each replica having random contact arrivals and contact service times following a stochastic arrival process according to a Poisson probability distribution; processor executing computer readable instructions to run multiple iterations of each simulation to optimize call center resource allocation; processor executing computer readable instructions to test a particular simulation iteration against a criterion of convergence; and processor executing computer readable instructions to allocate call center resource based on the particular simulation iteration with a successful criterion of convergence.

* * * * *

UNITED STATES PATENT AND TRADEMARK OFFICE
CERTIFICATE OF CORRECTION

PATENT NO.          : 8,396,204 B2
APPLICATION NO.     : 13/267231
DATED               : March 12, 2013
INVENTOR(S)         : Jose Luis Beltran Guerrero et al.

Page 1 of 1

It is certified that error appears in the above-identified patent and that said Letters Patent is hereby corrected as shown below:

In the Claims:

In column 24, line 28, in Claim 2, delete "order;" and insert -- order, --, therefor.

In column 25, line 11, in Claim 6, delete "m." and insert -- m --, therefor.

In column 25, line 23, in Claim 7, delete "p" and insert -- µ --, therefor.

In column 25, line 52, in Claim 9, delete "X$_1$," and insert -- X$_i$, --, therefor.

In column 25, line 60, in Claim 9, delete " $x_{kt} = \sum_{i \in \phi_k} \left( y_{it} \frac{s_{kt}^{(n)} \mu_{ik}}{\sum_{j \in k(i)} s_{jt}^{(n)} \mu_{ij}} \right)$ " and insert -- $x_{kt} = \sum_{i \in \phi_k} (y_{it} \frac{s_{kt}^{(n)} \mu_{ik}}{\sum_{j \in k(i)} s_{jt}^{(n)} \mu_{ij}})$, $\forall k; \forall t$ ; and --, therefor.

In column 26, line 17, in Claim 11, before "determining" delete "further comprising".

Signed and Sealed this
Thirteenth Day of August, 2013

Teresa Stanek Rea
*Acting Director of the United States Patent and Trademark Office*